United States Patent
Lim et al.

(10) Patent No.: US 11,961,976 B2
(45) Date of Patent: Apr. 16, 2024

(54) MULTIPLE BATTERY CELL ARCHITECTURE FOR OUTDOOR MOUNTED COMPUTING DEVICES

(71) Applicant: Google LLC, Mountain View, CA (US)

(72) Inventors: James Robert Lim, Mountain View, CA (US); Wei Li, Saratoga, CA (US); Brian Conner, Davenport, CA (US); Brett Wilson, Los Altos, CA (US)

(73) Assignee: Google LLC, Mountain View, CA (US)

( * ) Notice: Subject to any disclaimer, the term of this patent is extended or adjusted under 35 U.S.C. 154(b) by 373 days.

(21) Appl. No.: 17/194,480

(22) Filed: Mar. 8, 2021

(65) Prior Publication Data

US 2022/0285741 A1 Sep. 8, 2022

(51) Int. Cl.
*H01M 10/42* (2006.01)
*H01M 10/48* (2006.01)

(52) U.S. Cl.
CPC ....... *H01M 10/425* (2013.01); *H01M 10/482* (2013.01); *H01M 10/486* (2013.01); *H01M 2010/4271* (2013.01)

(58) Field of Classification Search
CPC ............. H01M 10/425; H01M 10/482; H01M 2010/4271
See application file for complete search history.

(56) References Cited

U.S. PATENT DOCUMENTS

| | | | |
|---|---|---|---|
| 2010/0089547 A1* | 4/2010 | King | B60L 58/26 903/907 |
| 2014/0091748 A1* | 4/2014 | Hermann | H02J 7/00 320/130 |
| 2016/0137092 A1 | 5/2016 | Thieme et al. | |
| 2016/0359207 A1* | 12/2016 | Cornelius | H01M 10/615 |
| 2016/0380315 A1 | 12/2016 | Weicker et al. | |
| 2020/0005625 A1 | 1/2020 | Conner | |
| 2020/0058968 A1 | 2/2020 | Thompson et al. | |

FOREIGN PATENT DOCUMENTS

CN 105601968 * 5/2016
CN 105601968 B 5/2016

OTHER PUBLICATIONS

CN 105601968 MT (Year: 2016).*
"Extended European Search Report", EP Application No. 22160292.3, dated Aug. 4, 2022, 12 pages.
Autocar Pro News Desk, "NKG Develops Lithium-ion Battery with Operating Temperature up to to 105deg C," retrieved from https://www.autocarpro.in/news-international/ngk-develops%C2%A0lithiumion-battery-with-operating-temperature-up-to%C2%A0-105deg-c-56923, Published Jul. 31, 2020, accessed Mar. 8, 2021, 4 pp.

* cited by examiner

*Primary Examiner* — Alexander Usyatinsky
(74) *Attorney, Agent, or Firm* — Colby Nipper PLLC (57) ABSTRACT

An example outdoor mounted device includes a first battery configured to operate at a low temperature range that at least includes negative 20 Celsius; a second battery configured to operate at a high temperature range; a temperature sensor; and processing circuitry configured to: determine, based on data received from the temperature sensors, a current temperature; responsive to determining that the current temperature is within the low temperature range, cause one or more components of the computing device to operate using electrical energy sourced from the first battery; and responsive to determining that the current temperature is within the high temperature range, cause the one or more components of the computing device to operate using electrical energy sourced from the second battery.

20 Claims, 5 Drawing Sheets

MULTIPLE BATTERY CELL ARCHITECTURE FOR OUTDOOR MOUNTED COMPUTING DEVICES

BACKGROUND

Some electronic devices, such as cameras, doorbells, and speakers may be configured to be mounted (e.g., to a structure or other object). When mounted outdoors, such electronic devices may be exposed to outdoor conditions that include uncontrolled temperatures. Outdoor mounted electronic devices may operate using electrical energy received from a wired power source, or electrical energy received from a battery.

SUMMARY

In general, aspects of this disclosure are directed to outdoor mountable computing devices that includes at least two batteries. An outdoor mounted computing device may be subjected to a wide range of temperatures that may impact battery performance. For instance, an outdoor mounted computing device in Minnesota may be subjected to temperatures as low as negative 40 Celsius to temperatures as high as 46 Celsius. While it may be desirable for an outdoor mounted computing device to be capable of operation across such a range of temperatures, where the device operates using battery power, a single battery may not be capable of providing sufficient power across such a range of temperatures.

In accordance with one or more aspects of this disclosure, an outdoor mountable computing device may include at least two batteries having different temperature operating ranges. For instance, a first battery may be configured to operate at a low temperature range and a second battery may be configured to operate at a high temperature range. In operation, when the outdoor mountable computing device is subjected to a temperature in the low temperature range, the outdoor mountable computing device may draw power from the first battery. Similarly, when the outdoor mountable computing device is subjected to a temperature in the high temperature range, the outdoor mountable computing device may draw power from the second battery. In this way, a temperature operating range of the outdoor mountable computing device may be increased.

In one example, a computing device configured to be mounted outdoors includes configured to be mounted outdoors, the computing device comprising: a first battery configured to operate at a low temperature range that at least includes negative 20 Celsius; a second battery configured to operate at a high temperature range, wherein an upper bound of the high temperature range is greater than an upper bound of the low temperature range, and wherein a lower bound of the low temperature range is lesser than a lower bound of the high temperature range; a temperature sensor; and processing circuitry configured to: determine, based on data received from the temperature sensors, a current temperature; responsive to determining that the current temperature is within the low temperature range, cause one or more components of the computing device to operate using electrical energy sourced from the first battery; and responsive to determining that the current temperature is within the high temperature range, cause the one or more components of the computing device to operate using electrical energy sourced from the second battery.

In another example, a method includes determining a current temperature of an outdoor mounted device; responsive to determining that the current temperature is within a low temperature range, operating one or more components of the outdoor mounted device using electrical energy sourced from a first battery of the outdoor mounted device, wherein the first battery is configured to operate at the low temperature range, and wherein the low temperature range at least includes negative 20 Celsius; and responsive to determining that the current temperature is within a high temperature range, operating the one or more components using electrical energy sourced from a second battery of the outdoor mounted device, wherein the second battery is configured to operate at the high temperature range, wherein an upper bound of the high temperature range is greater than an upper bound of the low temperature range, and wherein a lower bound of the low temperature range is lesser than a lower bound of the high temperature range.

In another example, an outdoor mountable device includes a first battery configured to operate at a low temperature range that at least includes negative 20 Celsius; a second battery configured to operate at a high temperature range, wherein an upper bound of the high temperature range is greater than an upper bound of the low temperature range, and wherein a lower bound of the low temperature range is lesser than a lower bound of the high temperature range; and means for determining a current temperature of the outdoor mountable device; means for operating, responsive to determining that the current temperature is within a low temperature range, one or more components of the outdoor mounted device using electrical energy sourced from the first battery; and means for operating, responsive to determining that the current temperature is within a high temperature range, the one or more components using electrical energy sourced from the second battery of the outdoor mounted device.

Additional features, advantages, and embodiments of the disclosed subject matter may be set forth or apparent from consideration of the following detailed description, drawings, and claims. Moreover, it is to be understood both the foregoing summary and the following detailed description are illustrative and are intended to provide further explanation without limiting the scope of the claims.

DETAILED DESCRIPTION

Figure 1:
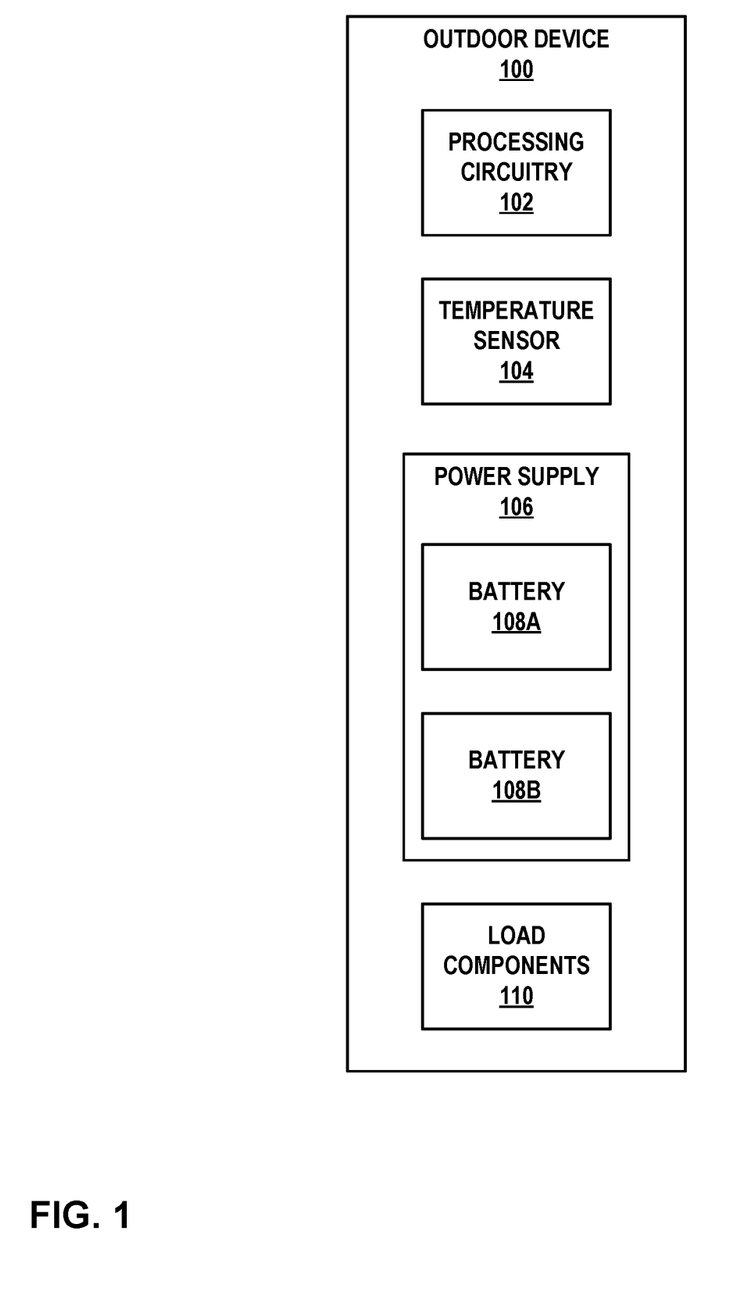
FIG. 1 is a block diagram illustrating an outdoor mountable computing device 100 that includes batteries having different operating temperature ranges, in accordance with one or more aspects of this disclosure.

FIG. 1 is a block diagram illustrating an outdoor mountable computing device 100 that includes batteries having different operating temperature ranges, in accordance with one or more aspects of this disclosure. Examples of outdoor mountable computing device 100 ("device 100") include, but are not limited to, cameras, doorbells, doorbells with integrated cameras, locks, speakers, alarm system components (e.g., motion sensors), and the like. A device may be considered to be "outdoor mountable" where the device includes components, such as mounting hardware (e.g., screw holes, keyholes fittings, etc.), that are designed to enable the device to be physically attached to a structure and operate in various temperature ranges. As shown in FIG. 1, device 100 may include processing circuitry 102, temperature sensor 104, power supply 106, and load components 110.

Processing circuitry 102 may include one or more of a microprocessor, a controller, a digital signal processor (DSP), a central processing unit (CPU), a graphics processing unit (GPU), an application specific integrated circuit (ASIC), a field-programmable gate array (FPGA), or equivalent discrete or integrated logic circuitry. The functions attributed to processing circuitry 102 in this disclosure may be embodied as software, firmware, hardware and combinations thereof. Although example device 100 of FIG. 1 is illustrated as including one processing circuitry 102, other example computing devices according to this disclosure may include multiple processors (or multiple so-called "cores," which is another way to refer to processors when packaged together) configured to execute one or more functions attributed to processing circuitry 102 of device 100 individually or in different cooperative combinations.

Temperature sensor 104 may be configured to output a signal representative of a temperature. Examples of temperature sensor 104 include, but are not limited to, physical temperature sensors (e.g., thermistors, thermocouples, resistance thermometers, silicon bandgap temperature sensors, etc.) and virtual temperature sensors (e.g., components configured to receive a temperature from an external device, such as a weather service). The temperature measured by temperature sensor 104 may be an ambient temperature of an environment in which device 100 is located, or may be a temperature of one or more components of device 100 (e.g., a temperature of battery 108A and/or a temperature of battery 108B). Temperature sensor 104 may output the signal representative of the temperature to one or more other components of device 100, such as processing circuitry 102.

Power supply 106 may be capable of supplying electrical power to various components of outdoor device 100. Examples of power supply 106 include, but are not limited to, on-board power supplies (e.g., batteries, solar panels, etc.) and external power supplies (e.g., power receptacles configured to receive electrical energy from an external device, such as via a power grid via a transformer).

Load components 110 may be configured to operate using electrical energy provided by power supply 106. Load components 110 may include, but are not necessarily limited to, cameras, physical buttons, lights, motion sensors, optical sensors, proximity sensors, and the like. Each of load components 110 may be controllable. For instance, processing circuitry 102 may selectively activate (e.g., turn on) or deactivate (e.g., turn off) each of load components 110.

Processing circuitry 102 may control operation of load components 108 to perform various functions. As one example, processing circuitry 102 may control operation of a camera of load components 108 to perform a surveillance function. For instance, processing circuitry 102 may control the camera to capture images and may output a representation of the captured images to an external device (e.g., via a wired or wireless network connection). As another example, processing circuitry 102 may control operation of a physical button to perform a chime function. For instance, responsive to receiving user input via the physical button, processing circuitry 102 may trigger a notification at an external device (e.g., via a wired or wireless network connection).

Being an outdoor mounted computing device, device 100 may be subjected to a wide range of temperatures. For instance, device 100 may be subjected to temperatures as low as negative 40 degC. (e.g., degrees Celsius) to temperatures as high as 80 degC. It may be desirable for device 100 to be capable of operation across as much of such a range of temperatures as possible. However, where device 100 operates using battery power (i.e., where power supply 106 includes one or more batteries), a single battery may not be capable of providing sufficient power across much of such a range of temperatures. For instance, a single lithium ion (Li-ion) battery may only have an operating (discharge) temperature of negative 20 degC. to 60 degC. and a Japan Electronics and Information Technology (JEITA) charge profile within 0 degC. and 60 degC.

In accordance with one or more aspects of this disclosure, power supply 106 of device 100 may include at least two batteries having different temperature operating ranges. As shown in FIG. 1, power supply 106 may include battery 108A and battery 108B (collectively, "batteries 108"). Battery 108A may be configured to operate at a low temperature range and battery 108B may be configured to operate at a high temperature range. A lower bound of the low temperature range may be less than a lower bound of the high temperature range. Similarly, an upper bound of the high temperature range may be greater than an upper bound of the low temperature range.

The low temperature range may include/encompass temperatures below which traditional computing devices (and their batteries) are designed to operate (e.g., laptops are designed to operate above 10 degC. and have no reason to operate lower as a user's hands would either be too cold to type or have gloves that make typing ineffective). As one example, the low temperature range may at least encompass negative 20 degC. to 0 degC. As another example, the low temperature range may at least encompass negative 40 degC. to 15 degC. As another example, the low temperature range may at least encompass negative 40 degC. to negative 20 degC.

The high temperature range may include/encompass temperatures above which traditional Li-ion batteries may not be designed to operate. As one example, the high temperature range may at least encompass 40 degC. to 70 degC. As another example, the high temperature range may at least encompass 45 degC. to 80 degC. As another example, the high temperature range may at least encompass 60 degC. to 80 degC.

In operation, processing circuitry 102 may select which of batteries 108 from which to draw power (e.g., for operation of processing circuitry 102 and/or one or more of load components 110). For instance, responsive to determining that a current temperature (e.g., of batteries 108) is within the low temperature range, processing circuitry 102 may cause one or more of load components 110 to draw power from battery 108A (i.e., the "low temperature" battery). Similarly, responsive to determining that a current temperature (e.g., of batteries 108) is within the high temperature range, processing circuitry 102 may cause one or more of load components 110 to draw power from battery 108B (i.e., the "high temperature" battery). As the lower bound of the low temperature range may be less than the lower bound of the high temperature range and the upper bound of the high temperature range may be greater than the upper bound of the low temperature range, including battery 108A and battery 108B may enable an increase in a temperature operating range of device 100.

In some examples, the low temperature range and the high temperature range may overlap in part. For instance, the upper bound of the low temperature range may be greater than the lower bound of the high temperature range. A range of temperatures in which the low temperature range overlaps the high temperature range may be referred to as an intermediate temperature range. A lower bound of the intermediate temperature range may be the lower bound of the high temperature range and an upper bound of the intermediate range may be an upper bound of the low temperature range. As one example, the intermediate temperature range at least include 15 degC. to 40 degC. In such examples, responsive to determining that a current temperature (e.g., of batteries 108) is within the intermediate temperature range, processing circuitry 102 may cause one or more of load components 110 to draw power from both battery 108A and battery 108B. In this way, device 100 may be capable of operation at abnormal temperatures (e.g., the low temperature range and the high temperature range) while having an extended battery life when operating at normal temperatures.

Figure 2:
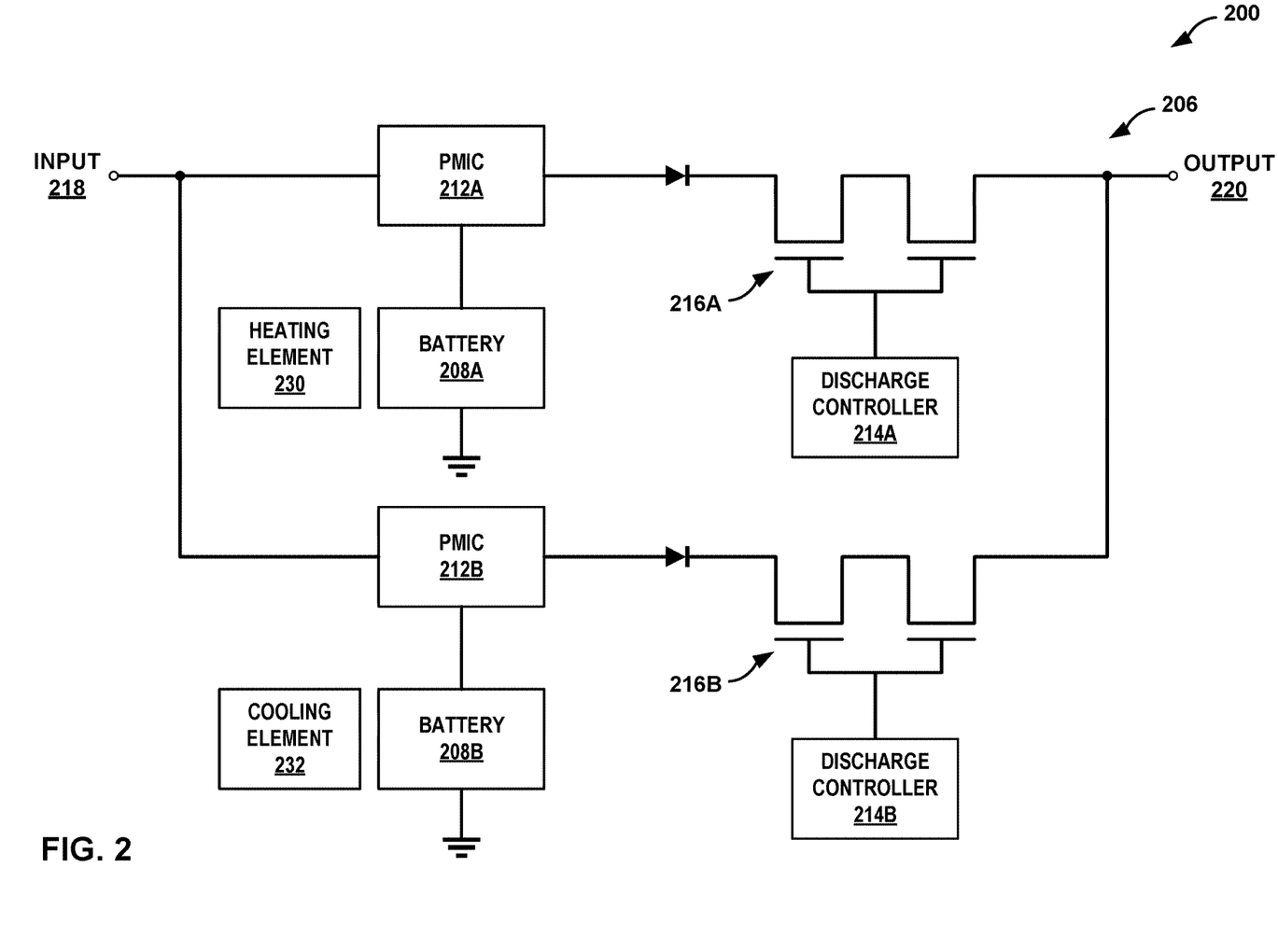
FIG. 2 is a schematic diagram illustrating example components of a power supply of an outdoor mountable computing device that includes multiple batteries having different operating temperature ranges, in accordance with one or more aspects of this disclosure.

FIG. 2 is a schematic diagram illustrating example components of a power supply of an outdoor mountable computing device that includes multiple batteries having different operating temperature ranges, in accordance with one or more aspects of this disclosure. Outdoor mountable computing device 200 of FIG. 2 ("device 200") may be considered an example of device 100 of FIG. 1. For instance, power supply 206 of device 200 of FIG. 2 may be an example of power supply 106 of device 100 of FIG. 1. As shown in FIG. 2, power supply 206 may include power management integrated circuits (PMICs) 212A and 212B (collectively, "PMICs 212"), batteries 208A and 208B (collectively, "batteries 208"), discharge controllers 214A and 214B (collectively, "discharge controllers 214"), power switches 216A and 216B (collectively, "power switches 216"), input 218, and output 220.

Input 218 may represent any source of electrical energy that is different than batteries 208. Examples of input 218 include, but are not necessarily limited to, solar panels, wired external power sources (e.g., wired power signals received via a wire or cable connected to device 200). In some examples, such as where device 200 is entirely battery operated, no power may be received via input 218 and/or input 218 may be omitted. Even when electrical energy is being received via input 218, a peak current used by device 200 may exceed a peak current available via input 218. As such, power from one or both of batteries 208 may be used to supplement power received via input 218 during high peak current operations. Similarly, power received via input 218 may be used to charge batteries 208 outside of high peak current operations.

PMICs 212 may perform one or more operations to manage operation of batteries 208. Examples of operations that may be performed by PMICs 212 include, but are not limited to, battery management, voltage regulation (e.g., DC to DC conversion), and charging (e.g., using power received via input 218). In some examples, PMICs 212 may be configured to determine a state of charge of their respective batteries. For instance, PMIC 212A may determine a state of charge of battery 208A and PMIC 212B may determine a state of charge of battery 208B. The term state of charge may be a value that represents a ratio of a remaining capacity of a battery to a rated capacity of the battery. For instance, where a remaining capacity of a battery is 3000 milliamp hours (mAh) and a rated capacity of the battery is 5000 mAh, the state of charge of the battery may be 60%.

PMICs 212 may operate a representation of the determined states of charge to an external device. For instance, PMICs 212 may output, via a wireless connection (e.g., Wi-Fi, Bluetooth, Zigbee, etc.), a first value that represents a state of charge of battery 208A and a second value that represents a state of charge of battery 208B. The external device (e.g., a mobile computing device) may present the values to a user, who may take various actions. For instance, where the state of charge of battery 208A indicates that battery 208A is nearly depleted, the user may swap battery 208A for another low temperature battery with a greater state of charge or may remove battery 208A for charging and subsequently return battery 208A to device 200.

While illustrated as discrete components, in some examples PMICs 212 may be a single component. For instance, a single PMIC may be a multi-channel PMIC that manages all of batteries 208.

Batteries 208 may be configured to store electrical energy for subsequent use. Batteries 208 may be any type of primary (e.g., non-rechargeable) or secondary cell (e.g., rechargeable). Examples of secondary cells that may be used as batteries 208 include, but are not limited to, lithium-ion, a nickel-cadmium, nickel-metal hydride, lead acid, or lithium-ion polymer.

As discussed above and in accordance with one or more aspects of this disclosure, batteries 208 may be selected to have different temperature operating ranges. For instance, battery 208A may be configured to operate at a low temperature range and may be referred to as a low temperature battery, and battery 208B may be configured to operate at a high temperature range and may be referred to as a high temperature battery.

A battery may be configured to operate at a particular temperature range by adjusting a chemistry (e.g., of electrolytes) or other physical characteristic of the battery. As one example, battery 208B (e.g., the high temperature battery) may contain electrolytes comprised of high boiling point solvents such as propylene carbonate or equivalent ionic conductivity electrolytes variant, such as semi-solid-state, non-flammable/gel, filler infused or hybrids and combinations thereof. In this way, battery 208B may operate at high temperatures (e.g., 60 degC. up to 80 degC.) while being inherently safe as the materials and structures may prevent thermal runaway. As another example, battery 208A (e.g., the low temperature battery) may contain electrolytes comprised of lower boiling point solvents such as dimethyl carbonate with stabilizing additives, such as fluoroethlyene or variants including hybrids and combinations thereof. In this way, battery 208A may operate at low temperature (e.g., 0 degC down to negative 40 degC.) without experiencing performance degradation.

As discussed in further detail below, in addition to having different operating temperature ranges, batteries 208 may have different charging temperature ranges. For instance, battery 208A may be able to be charged at lower temperatures than battery 208B. Similarly, battery 208B may be able to be charged at higher temperatures than battery 208A. The operating temperature range of a battery may be the same as, or may be different than, the charging temperature range of the battery. For instance, battery 208A may be capable of operation at lower temperatures than battery 208A is capable of being charged at a 1 C rate.

Discharge controllers 214, in tandem with power switches 216, may control which of batteries 208 supplies power to output 220. For instance, where device 200 determines to draw power from battery 208A (e.g., responsive to determining that a temperature is within an operating range of battery 208A), discharge controller 214A may output a signal that causes switches 216A to close, thereby creating a current path from battery 208A to output 220. Similarly, where device 200 determines to draw power from battery 208B (e.g., responsive to determining that a temperature is within an operating range of battery 208B), discharge controller 214B may output a signal that causes switches 216B to close, thereby creating a current path from battery 208B to output 220. Additionally or alternatively, where device 200 determines to draw power from both battery 208A and battery 208B (e.g., responsive to determining that a temperature is within an operating range of both battery 208A and battery 208B), discharge controller 214A may output a signal that causes switches 216A to close and discharge controller 214B may output a signal that causes switches 216B to close, thereby creating a current paths from both batteries 208 to output 220. As shown in FIG. 2, in some examples, diodes may be included to prevent cross-charging between batteries 208.

Where power is being sourced from both batteries 208, batteries 208 may form a 1S2P arrangement. Similarly, where power is being sourced from only one of batteries 208, batteries 208 may form a 1S1P arrangement. Other examples of this disclosure may have other arrangements, such as 2S2P or 1S4P and any other multiple cell configuration, but with Supplemental capacitors/supercapacitors could be used to bridge high battery impedance (internal resistance) states, for delivering peak pulse/load currents.

Output 220 may represent electronic components configured to operate using electrical power provided by one or both of batteries 208. Examples of output 220 include, but are not limited to, processing circuitry 102 and load components 110 of FIG. 1.

As discussed above, batteries 208 may have temperature charging temperature ranges. In some examples, the availability of power via input 218 may be unpredictable and/or temporary (e.g., where input 218 includes a solar panel). As such, it may be desirable for device 200 to charge one or both of batteries 208 as quickly as possible when power is available via input 218.

In accordance with one or more aspects of this disclosure, device 200 may include temperature control devices configured to modify a temperature of one or both of batteries 208 in order to increase an available charging rate. As one example, device 200 may include heating element 230, which may be configured to output heat to at least battery 208A. In operation, responsive to determining that the current temperature (e.g., of battery 208A) is less than a threshold temperature of battery 208A, heating element 230 may be activated (e.g., by processing circuitry of device 200). Example of heating element 230 include, but are not limited to, any resistive heating element or any other device that converts electrical energy to thermal energy. As discussed below and can be seen in FIG. 3B, heating battery 208A may increase a C-rate of battery 208A. For instance, heating battery 208A from 10 degC. to 15 degC. may increase the C-rate from 0.5 C to 1 C, thereby doubling the charge rate. The temperature threshold of battery 208A may be any temperature that results in an increase in charging rate of battery 208A. For instance, as can be seen in FIG. 3B, example temperature thresholds of battery 208A include 0 degC and 15 degC.

As another example, device 200 may include cooling element 232, which may be configured to remove heat from at least battery 208B. In operation, responsive to determining that the current temperature (e.g., of battery 208B) is greater than a threshold temperature of battery 208B, cooling element 232 may be activated (e.g., by processing circuitry of device 200). Example of cooling element 232 include, but are not limited to, fans, thermoelectric coolers, and the like. As discussed below and can be seen in FIG. 4B, cooling battery 208A may increase a C-rate of battery 208A. For instance, heating battery 208A from 50 degC. to 45 degC. may increase the C-rate from 0.5 C to 1 C, thereby doubling the charge rate. The temperature threshold of battery 208B may be any temperature that results in an increase in charging rate of battery 208B. For instance, as can be seen in FIG. 4B, example temperature thresholds of battery 208A include 70 degC., 60 degC., and 45 degC.

Figure 3A:
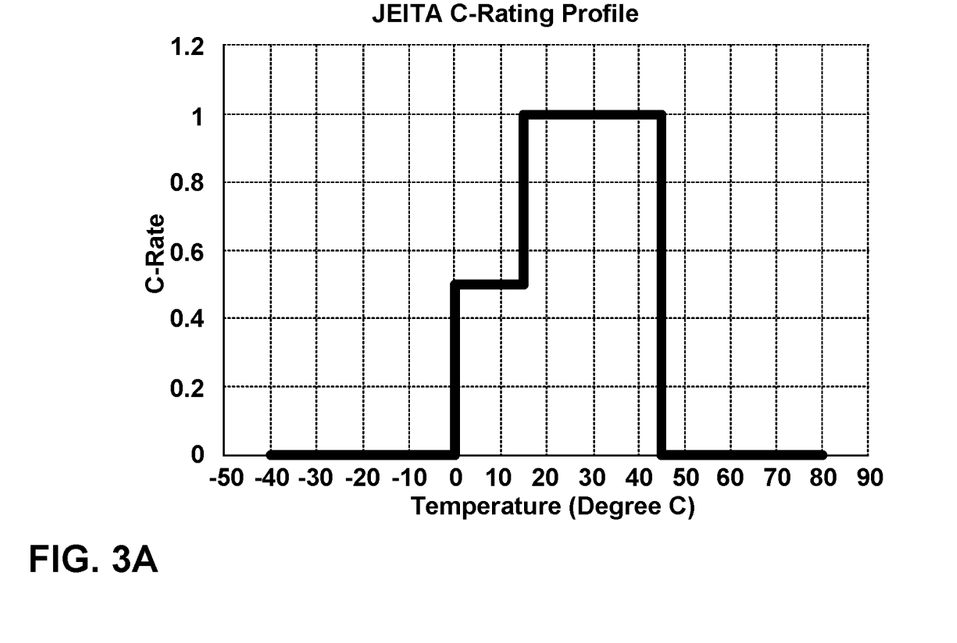
FIGS. 3A and 3B are graphs illustrating temperature ranges of a low temperature battery, in accordance with one or more aspects of this disclosure.
Figure 3B:
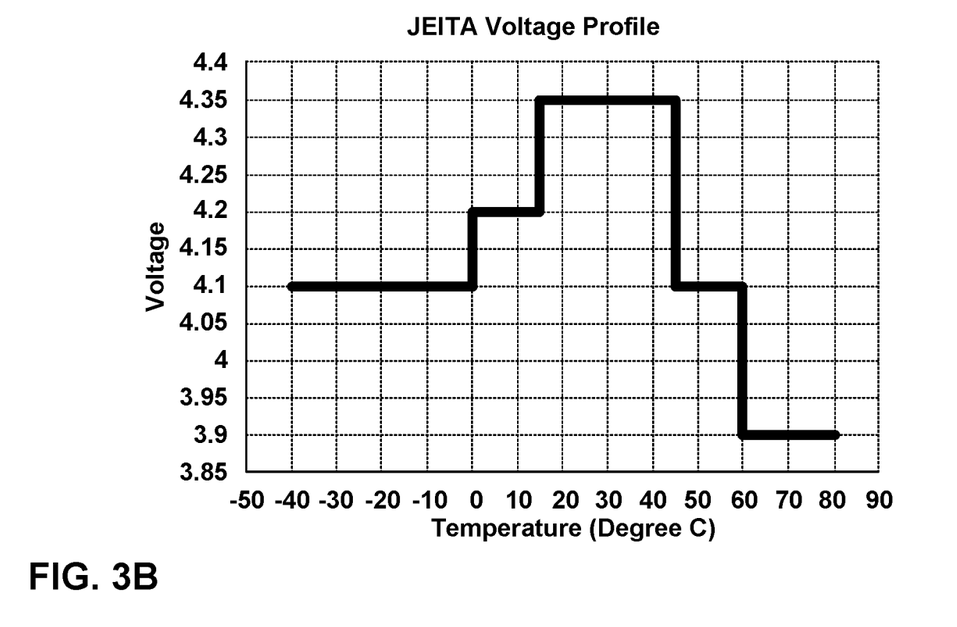

FIGS. 3A and 3B are graphs illustrating temperature ranges of a low temperature battery, in accordance with one or more aspects of this disclosure. FIG. 3A illustrates an example relationship between charging current and temperature across a range of negative 40 degC. to 80 degC. of a low temperature battery, such as battery 108A of FIG. 1 or battery 208A of FIG. 2. FIG. 3B illustrates an example relationship between output voltage and temperate across a range of negative 40 degC. to 80 degC. of a low temperature battery, such as battery 108A of FIG. 1 or battery 208A of FIG. 2. As shown in FIGS. 3A and 3B, the low temperature battery may be able to charge in the 0 degC to 45 degC. range and operate at the negative 40 degC. to 45 degC. range.

As discussed above, where the temperature is greater than an upper bound of the low temperature range, the low temperature battery may not be used. For instance, as shown in FIGS. 3A and 3B, at temperatures greater than 45 degC., the voltage of the low temperature battery may be regulated to a derated voltage and placed into "storage" mode (disconnected state). The low temperature battery may retain at least 30% energy performance at 0.2 C discharge from −40 degC. to <15 degC. down to cut-off voltage. The AC impedance and DC internal resistance of the battery may be sized accordingly to limit a voltage drop of to less than 300 mV. The battery self-discharge rate may be no more than 80 microAmps across the full voltage range. Cycle life expectations to be at least 50 cycles at an end of life AC impedance and DC internal resistance at 2x. Moreover, the low temperature battery may be able to handle float voltage time of at least 2 years continuous.

Figure 4A:
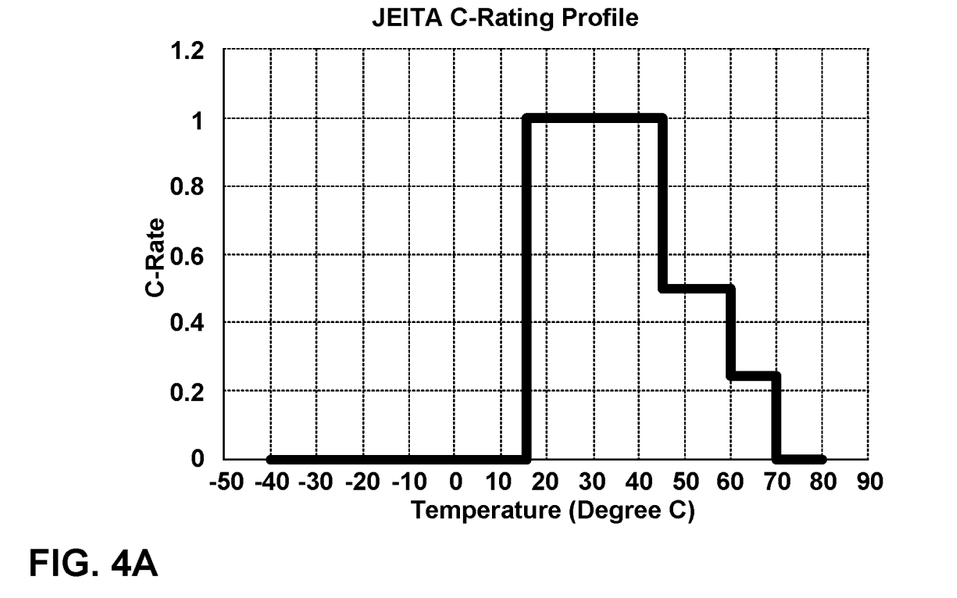
FIGS. 4A and 4B are graphs illustrating temperature ranges of a high temperature battery, in accordance with one or more aspects of this disclosure.
Figure 4B:
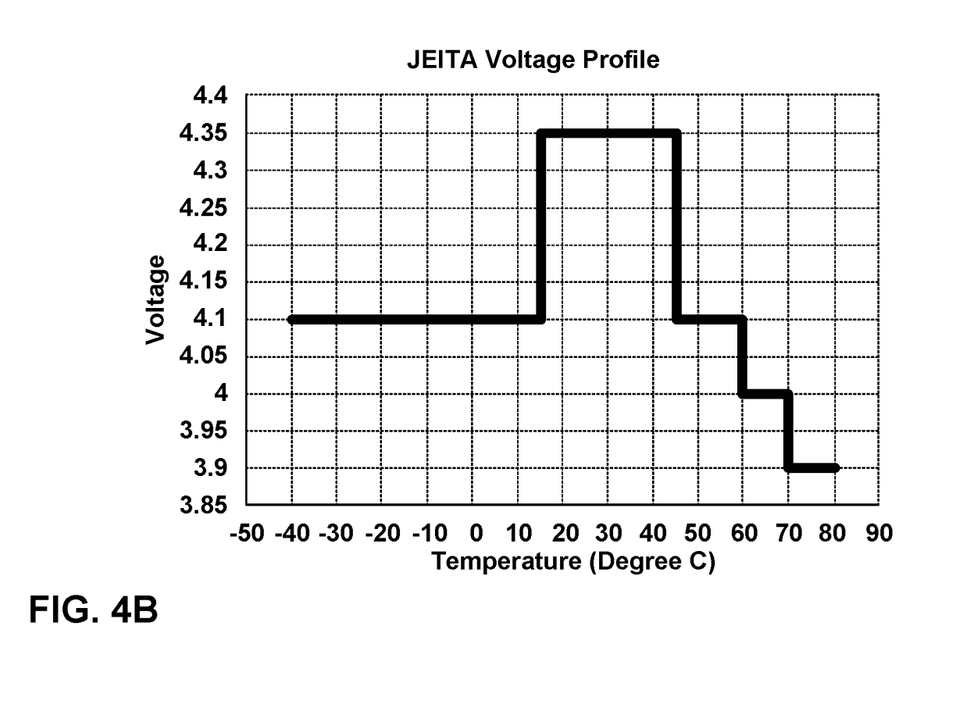

FIGS. 4A and 4B are graphs illustrating temperature ranges of a high temperature battery, in accordance with one or more aspects of this disclosure. FIG. 4A illustrates an example relationship between charging current and temperature across a range of negative 40 degC. to 80 degC. of a high temperature battery, such as battery 108B of FIG. 1 or battery 208B of FIG. 2. FIG. 4B illustrates an example relationship between output voltage and temperate across a range of negative 40 degC. to 80 degC. of a high temperature battery, such as battery 108B of FIG. 1 or battery 208B of FIG. 2. As shown in FIGS. 4A and 4B, the high temperature battery may be able to charge in the 15 degC. to 70 degC. range and operate at the 15 degC. to 80 degC. range.

As discussed above, where the temperature is less than a lower bound of the high temperature range, the high temperature battery may not be used. For instance, as shown in FIGS. 4A and 4B, at temperatures less than 15 degC., the voltage of the high temperature battery may be regulated to a derated voltage and placed into "storage" mode (disconnected state). The high temperature battery may retain at least 90% energy performance at 0.2 C discharge from >15 degC. to 80 degC. down to cut-off voltage. The AC impedance and DC internal resistance of the battery may be sized accordingly to limit a voltage drop of to less than 300 mV. The battery self-discharge rate may be no more than 120 microAmps across the full voltage range. Cycle life expectations to be at least 50 cycles at an end of life AC impedance and DC internal resistance at $2x$. Moreover, the high temperature battery may be able to handle float voltage time of at least 2 years continuous.

The term C-rate in FIGS. 3A and 4A may be a current rate of minimum capacity divided by 1 hour. For instance, a 1000 mAh battery has a 1 C current rate of 1000 mA (1000 mAh/1 h=1000 mA).

Figure 5:
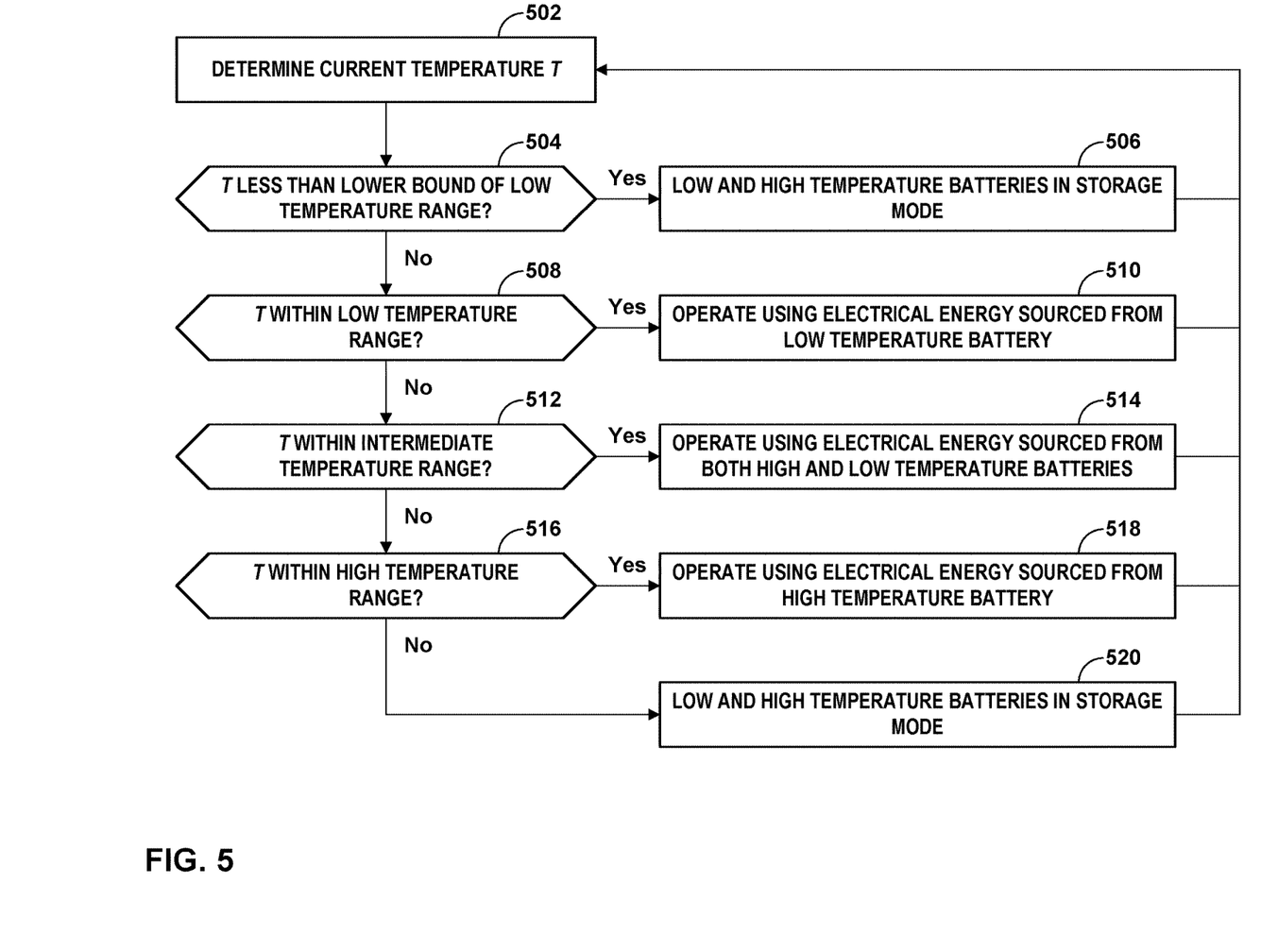
FIG. 5 is a flow diagram illustrating an example operation of an outdoor mountable device that includes multiple batteries having different temperature operating ranges, in accordance with one or more techniques of the present disclosure.

FIG. 5 is a flow diagram illustrating an example operation of an outdoor mountable device that includes multiple batteries having different temperature operating ranges, in accordance with one or more techniques of the present disclosure. For purposes of explanation, the technique of FIG. 5 is described with reference to device 100 of FIG. 1 and device 200 of FIG. 2.

Device 100 may determine a current temperature T (502). For instance, temperature sensor 104 may output data to processing circuitry 102, the data representing a temperature of battery 108A, battery 108B, or another temperature of device 100. Processing circuitry 102 may determine, based on the data, the current temperature T.

As discussed above and in accordance with one or more techniques of this disclosure, processing circuitry 102 may determine which, if any, battery to use to supply electrical energy to one or more components of device 100. For instance, based on the current temperature T, processing circuitry 102 may cause the one or more components to not operate at all, operate using electrical energy sourced from a low temperature battery, operate using electrical energy sourced from the low temperature battery and a high temperature battery, or operate using electrical energy sourced from the high temperature battery.

As one example, responsive to determining that the current temperature T is less than a lower bound of a low temperature range ("Yes" branch of 504), processing circuitry 102 may cause battery 108A and battery 108B to operate in a storage mode (506). For instance, PMICs 212 may regulate voltages of batteries 208 to derated voltages and place batteries 208 in a disconnected state (e.g., cause discharge controllers 214 to open both of power switches 216).

As another example, responsive to determining that the current temperature T is within the low temperature range (e.g., between the lower bound of the low temperature range and a lower bound of an intermediate temperature range) ("Yes" branch of 508), processing circuitry 102 may cause load components 110 to operate using electrical energy sourced from battery 108A (i.e., the low temperature battery) (510). For instance, discharge controller 214A may close power switches 216A such that current may flow from battery 208A to output 220. In some examples, responsive to determining that the current temperature T is within the low temperature range, processing circuitry 102 may cause battery 108B to operate in the storage mode. For instance, PMIC 212B may regulate a voltage of battery 208B to a derated voltage and place battery 208B in a disconnected state (e.g., cause discharge controller 214B to open power switch 216B).

As another example, responsive to determining that the current temperature T is within the intermediate temperature range (e.g., between the lower bound of the intermediate temperature range and a lower upper bound of the high temperature range)("Yes" branch of 512), processing circuitry 102 may cause load components 110 to operate using electrical energy sourced from both battery 108A and battery 108B (i.e., the low temperature battery and the high temperature battery)(514). For instance, discharge controllers 214 may close power switches 216 such that current may flow from batteries 208 to output 220.

As another example, responsive to determining that the current temperature T is within the high temperature range (e.g., between the upper bound of the intermediate temperature range and an upper bound of the high temperature range)("Yes" branch of 516), processing circuitry 102 may cause load components 110 to operate using electrical energy sourced from battery 108B (i.e., the high temperature battery)(518). For instance, discharge controller 214B may close power switches 216B such that current may flow from battery 208B to output 220. In some examples, responsive to determining that the current temperature T is within the high temperature range, processing circuitry 102 may cause battery 108A to operate in the storage mode. For instance, PMIC 212A may regulate a voltage of battery 208A to a derated voltage and place battery 208A in a disconnected state (e.g., cause discharge controller 214A to open power switch 216A).

As another example, responsive to determining that the current temperature T is greater than the upper bound of the high temperature range ("No" branch of 516), processing circuitry 102 may cause battery 108A and battery 108B to operate in a storage mode (520). For instance, PMICs 212 may regulate voltages of batteries 208 to derated voltages and place batteries 208 in a disconnected state (e.g., cause discharge controllers 214 to open both of power switches 216).

As can be seen above, the amount of battery power may be dependent on temperature operating range. For instance, more battery power may be available when the current temperature is within the intermediate temperature range (e.g., as both the low temperature battery and the high temperature battery may provide power) then when operating in the low temperature range or the high temperature range (e.g., where only one of the low temperature battery and the high temperature battery provide power).

In accordance with one or more techniques of this disclosure, device 100 may adjust functionality based on the current temperature. For instance, as a reduced amount of power is available when device 100 is operating in the low and high temperature ranges as compared with the intermediate temperature range, device 100 may perform fewer functions when operating outside of the intermediate temperature range. As one example, responsive to determining that the current temperature is within the low temperature range, processing circuitry 102 may cause load components 110 to operate with a first set of functions. As another example, responsive to determining that the current temperature is within the intermediate temperature range, processing circuitry 102 may cause load components 110 to operate with a second set of functions. The second set of functions may be a superset of the first set of functions (e.g., include all functions of the first set of functions and at least one additional function). As another example, responsive to determining that the current temperature is within the low temperature range, processing circuitry 102 may cause load components 110 to operate with a third set of functions. The third set of functions may be a subset of the second set of functions (e.g., include less than all of the functions that are included in the second set). In some examples, the third set of functions may be identical to the first set of functions. In other examples, the third set of functions may not be identical to the first set of functions.

The functions included in the first and/or third sets may be selected to be core functions of device 100. For instance, where device 100 is a video doorbell capable of performing a surveillance function (e.g., by operating a camera of load components 110) and a chime function (e.g., by operating a chime button of load components 110), the chime function may be designated as a core function and be included in the first set of functions and/or the third set of functions. On the other hand, the surveillance function (e.g., which may consume significantly more power than the chime function) may not be designated a core function and may be omitted form the first set of functions and/or the third set of functions. As more power may be available when the second set of functions is performed (e.g., when the current temperature is in the intermediate temperature range), the second set of functions may include the surveillance function. In this way, functionality of device 100 may be prioritized based on the current temperature.

In some examples, the surveillance function may be subdivided into a full surveillance function and a partial surveillance function. Performance of the partial surveillance function may consume less power than performance of the full surveillance function. For instance, when performing the partial surveillance function, a camera of load components 110 may capture images at a reduced frame rate and/or a reduced resolution. In examples where the surveillance function is subdivided, the partial surveillance function may be included in the first and/or third set of functions while the full surveillance function may be included in the second set of functions.

The following numbered examples may illustrate one or more aspects of this disclosure:

Example 1

A computing device configured to be mounted outdoors, the computing device comprising: a first battery configured to operate at a low temperature range that at least includes negative 10 Celsius; a second battery configured to operate at a high temperature range, wherein an upper bound of the high temperature range is greater than an upper bound of the low temperature range, and wherein a lower bound of the low temperature range is lesser than a lower bound of the high temperature range; a temperature sensor; and processing circuitry configured to: determine, based on data received from the temperature sensors, a current temperature; responsive to determining that the current temperature is within the low temperature range, cause one or more components of the computing device to operate using electrical energy sourced from the first battery; and responsive to determining that the current temperature is within the high temperature range, cause the one or more components of the computing device to operate using electrical energy sourced from the second battery.

Example 2

The computing device of example 1, wherein the low temperature range further includes at least negative 20 Celsius.

Example 3

The computing device of example 1 or example 2, wherein the high temperature range includes at least 70 Celsius.

Example 4

The computing device of any of examples 1-3, wherein the processing circuitry is further configured to: responsive to determining that the current temperature is within an intermediate temperature range, cause the one or more components of the computing device to operate using electrical energy sourced from the first battery and the second battery.

Example 5

The computing device of example 4, wherein a lower bound of the intermediate temperature range is the lower bound of the high temperature range, and wherein an upper bound of the intermediate temperature range is the upper bound of the low temperature range.

Example 6

The computing device of example 5, wherein the intermediate temperature range at least includes 15 Celsius to 40 Celsius.

Example 7

The computing device of any of examples 4-6, wherein the processing circuitry is further configured to: cause, responsive to determining that the current temperature is within the low temperature range, the one or more components to operate with a first set of functions; and cause, responsive to determining that the current temperature is within the intermediate temperature range, the one or more components to operate with a second set of functions that is a superset of the first set of functions.

Example 8

The computing device of example 7, wherein the processing circuitry is further configured to: cause, responsive to determining that the current temperature is within the low temperature range, the one or more components to operate with a third set of functions that is a subset of the second set of functions.

Example 9

The computing device of example 7 or example 8, wherein the one or more components include a camera and a chime button, the first set of functions includes operating the chime button, and the second set of functions includes operating the chime button and the camera.

Example 10

The computing device of any of examples 1-9, wherein the processing circuitry is further configured to: determine a state of charge of the first battery; determine a state of charge of the second battery; and output, to an external device, an indication of the state of charge of the first battery and an indication of the state of charge of the second battery.

Example 11

The computing device of any of examples 1-10, further comprising: a power source that is different than the first battery and the second battery; and wherein the processing circuitry is further configured to: charge one or both of the first battery and the second battery using electrical energy received via the power source.

Example 12

The computing device of example 11, further comprising: a heating element configured to output heat to at least the first battery, wherein the processing circuitry is further configured to: activate the heating element responsive to determining that the current temperature is less than a threshold temperature of the first battery.

Example 13

The computing device of example 11 or example 12, further comprising: a cooling element configured to remove heat from at least the second battery, wherein the processing circuitry is further configured to: activate the cooling element responsive to determining that the current temperature is greater than a threshold temperature of the second battery.

Example 14

A method comprising: determining a current temperature of an outdoor mounted device; responsive to determining that the current temperature is within a low temperature range, operating one or more components of the outdoor mounted device using electrical energy sourced from a first battery of the outdoor mounted device, wherein the first battery is configured to operate at the low temperature range, wherein the low temperature range at least includes negative 10 Celsius; and responsive to determining that the current temperature is within a high temperature range, operating the one or more components using electrical energy sourced from a second battery of the outdoor mounted device, wherein the second battery is configured to operate at the high temperature range, wherein an upper bound of the high temperature range is greater than an upper bound of the low temperature range, and wherein a lower bound of the low temperature range is lesser than a lower bound of the high temperature range.

Example 15

The method of example 14, further comprising: responsive to determining that the current temperature is within an intermediate temperature range, operating the one or more components using electrical energy sourced from the first battery and the second battery, wherein a lower bound of the intermediate temperature range is the upper bound of the low temperature range, and wherein an upper bound of the intermediate temperature range the lower bound of the high temperature range.

Example 16

The method of example 14 or example 15, further comprising: causing, responsive to determining that the current temperature is within the low temperature range, the one or more components to operate with a first set of functions; and causing, responsive to determining that the current temperature is within the intermediate temperature range, the one or more components to operate with a second set of functions that is a superset of the first set of functions.

Example 17

The method of any of examples 14-16, further comprising: charging, using electrical power received via a power source that is different than the first battery and the second battery, one or both of the first battery and the second battery.

Example 18

The method of example 17, further comprising: responsive to determining that the current temperature is less than a threshold temperature of the first battery, activating a heating element that is configured to output heat to at least the first battery.

Example 19

The method of example 17 or example 18, further comprising: responsive to determining that the current temperature is greater than a threshold temperature of the second battery, activating a cooling element that is configured to remove heat from at least the second battery.

Example 20

An outdoor mountable device comprising: a first battery configured to operate at a low temperature range that at least includes negative 10 Celsius; a second battery configured to operate at a high temperature range, wherein an upper bound of the high temperature range is greater than an upper bound of the low temperature range, and wherein a lower bound of the low temperature range is lesser than a lower bound of the high temperature range; and means for determining a current temperature of the outdoor mountable device; means for operating, responsive to determining that the current temperature is within a low temperature range, one or more components of the outdoor mounted device using electrical energy sourced from the first battery; and means for operating, responsive to determining that the current temperature is within a high temperature range, the one or more components using electrical energy sourced from the second battery of the outdoor mounted device.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects have been described in this disclosure. These and other aspects are within the scope of the following claims.

The invention claimed is:

1. A computing device comprising:
a first battery configured to operate at a first temperature range;
a second battery configured to operate at a second temperature range, the second temperature range having an upper bound greater than an upper bound of the first temperature range;
one or more temperature sensors, at least one temperature sensor of the one or more temperature sensors disposed within the computing device, the one or more temperature sensors configured to collect measurements indicative of a temperature;
a heating element capable of heating at least one of the first battery or the second battery responsive to measurements received from the one or more temperature sensors indicative of the temperature being less than the first temperature range for the first battery or the second temperature range for the second battery;
one or more processors; and
memory storing one or more programs, the one or more programs comprising instructions that, when executed by the one or more processors, cause the one or more processors to:
determine, based on measurements received from the one or more temperature sensors, the temperature of the computing device;
responsive to a determination that the temperature is within the first temperature range, cause one or more components of the computing device to operate using electrical energy sourced from the first battery; and
responsive to a determination that the temperature is within the second temperature range, cause the one or more components of the computing device to operate using electrical energy sourced from the second battery.

2. The computing device of claim 1, wherein the first temperature range includes negative 20 Celsius.

3. The computing device of claim 1, wherein the second temperature range includes 70 Celsius.

4. The computing device of claim 1, wherein the one or more programs further comprise instructions that, when executed by the one or more processors, cause the one or more processors to:
direct the one or more components of the computing device to operate using electrical energy sourced from at least one of the first battery or the second battery responsive to a determination that the temperature is within a third temperature range, the third temperature range including (i) an upper bound less than a lower bound of the second temperature range and (ii) a lower bound greater than the upper bound of the first temperature range.

5. The computing device of claim 4, wherein an upper bound of the third temperature range is less than or equal to the lower bound of the second temperature range, and wherein the lower bound of the third temperature range is greater than or equal to the upper bound of the first temperature range.

6. The computing device of claim 5, wherein the lower bound of the third temperature range includes 15 Celsius and the upper bound of the third temperature range includes 40 Celsius.

7. The computing device of claim 4, wherein the one or more programs further comprise instructions that, when executed by the one or more processors, cause the one or more processors to:
direct the one or more components to operate with a first set of functions responsive to determining that the temperature is within the low temperature range; and
responsive to determining that the temperature is within the third temperature range, cause the one or more components to operate with a second set of functions that is a superset of the first set of functions.

8. The computing device of claim 7, wherein the one or more programs further comprise instructions that, when executed by the one or more processors, cause the one or more processors to:
direct the one or more components to operate with a third set of functions that is a subset of the second set of functions responsive to determining that the temperature is within the first temperature range.

9. The computing device of claim 7, wherein the computing device is configured to be mounted outdoors and the one or more components include a camera and a chime button, the first set of functions includes operating the chime button, and the second set of functions includes operating the chime button and the camera.

10. The computing device of claim 1, wherein the one or more programs further comprise instructions that, when executed by the one or more processors, cause the one or more processors to:
determine a state of charge of the first battery;
determine a state of charge of the second battery; and output, to an external device, an indication of the state of charge of at least one of the first battery or an indication of the state of charge of the second battery.

11. The computing device of claim 1, further comprising:
one or more input components configured to electrically couple to a power source, the power source excluding the first battery and the second battery; and
wherein the one or more programs further comprise instructions that, when executed by the one or more processors, cause the one or more processors to:
charge at least one of the first battery or the second battery using electrical energy received via the power source.

12. The computing device of claim 1, further comprising a cooling element configured to remove heat from at least the second battery.

13. The computing device of claim 11, wherein the power source comprises at least one of a solar panel, an external battery, or an external wired power supply.

14. The computing device of claim 11, wherein the computing device further comprises:
a power-management integrated circuit having at least one processor of the one or more processors, the power-management integrated circuit operatively coupled to the first battery and the second battery.

15. The computing device of claim 14, wherein the power-management integrated circuit is configured to perform voltage regulation to maintain a constant voltage level under varying loads and input voltages from at least one of the first battery, the second battery, or the power source.

16. The computing device of claim 14, wherein the power-management integrated circuit further comprises:
one or more discharge controllers; and
one or more power switches.

17. The computing device of claim 16, wherein the at least one processor of the power management integrated circuit, using the one or more discharge controllers and the one or more power switches, controls whether the one or more components of the computing device operate use electrical energy sourced from the first battery, the second battery, or both.

18. The computing device of claim 11, wherein charging the first battery is further based on the determination that the temperature is within the first temperature range.

19. The computing device of claim 11, wherein charging the second battery is further based on the determination that the temperature is within the second temperature range.

20. The computing device of claim 12, wherein the one or more programs further comprise instructions that, when executed by the one or more processors, cause the one or more processors to:
activate the cooling element responsive to a determination that the temperature is greater than the upper bound of the second temperature range of the second battery.

* * * * *